United States Patent
Choi et al.

(10) Patent No.: US 10,167,909 B2
(45) Date of Patent: Jan. 1, 2019

(54) METHOD AND APPARATUS FOR CONTROLLING DAMPER CLUTCH TO PREVENT ENGINE STALL

(71) Applicant: HYUNDAI AUTRON CO., LTD., Seongnam-si (KR)

(72) Inventors: Jongik Choi, Seoul (KR); Kwanghyuk Lim, Suwon-si (KR)

(73) Assignee: HYUNDAI AUTRON CO., LTD., Gyeonggi-do (KR)

( * ) Notice: Subject to any disclaimer, the term of this patent is extended or adjusted under 35 U.S.C. 154(b) by 149 days.

(21) Appl. No.: 15/341,873

(22) Filed: Nov. 2, 2016

(65) Prior Publication Data

US 2017/0122387 A1 May 4, 2017

(30) Foreign Application Priority Data

Nov. 2, 2015 (KR) .......................... 10-2015-0153358

(51) Int. Cl.
*F16D 48/06* (2006.01)

(52) U.S. Cl.
CPC .... *F16D 48/06* (2013.01); *F16D 2500/10412* (2013.01); *F16D 2500/3063* (2013.01); *F16D 2500/3067* (2013.01); *F16D 2500/30806* (2013.01); *F16D 2500/3108* (2013.01); *F16D 2500/3166* (2013.01); *F16D 2500/5048* (2013.01)

(58) Field of Classification Search
CPC ............. F16D 48/06; F16D 2500/3166; F16D 2500/5048; F16D 2500/30806; F16D 2500/3108; F16D 2500/3067; F16D 2500/10412; F16D 2500/3063

See application file for complete search history.

(56) References Cited

U.S. PATENT DOCUMENTS

| 5,626,534 | A | * | 5/1997 | Ashley | .................. B60W 10/02 477/79 |
| 5,679,098 | A | * | 10/1997 | Shepherd | .............. F16D 48/066 477/166 |
| 5,902,211 | A | * | 5/1999 | Jones | .................... F16D 48/066 192/30 W |
| 2013/0178330 | A1 | * | 7/2013 | Nefcy | ..................... F16D 48/06 477/5 |

(Continued)

FOREIGN PATENT DOCUMENTS

JP  58-65457 U  5/1983
JP  02-176265 A  7/1990

(Continued)

*Primary Examiner* — David J Hlavka
(74) *Attorney, Agent, or Firm* — Morgan, Lewis & Bockius LLP

(57) ABSTRACT

Disclosed are a method and an apparatus for controlling a damper clutch to prevent engine stall, and more particularly, to a method and an apparatus for controlling a damper clutch to prevent engine stall which can decide and correct when there is any error in control of a damper clutch in order to prevent engine stall. The method and the apparatus for controlling the damper clutch can decide and correct that a control unit of a damper clutch controller shows a wrong duty command value or a wrong current command value, thereby preventing engine stall, restraining decrease of acceleration power and blocking generation of noise or vibration.

11 Claims, 3 Drawing Sheets

(56) References Cited

U.S. PATENT DOCUMENTS

2014/0142824 A1* 5/2014 Kim .................. F16D 48/06
701/68

FOREIGN PATENT DOCUMENTS

| JP | 04-236846 A | 8/1992 |
| JP | 7-167288 A | 7/1995 |
| KR | 10-2003-0065754 A | 8/2003 |

* cited by examiner

METHOD AND APPARATUS FOR CONTROLLING DAMPER CLUTCH TO PREVENT ENGINE STALL

CROSS-REFERENCE TO RELATED APPLICATION

The present application claims the benefit of priority from Korean Patent Application No. 10-2015-0153358 filed in the Korean Intellectual Property Office on Nov. 2, 2015, the entire contents of which are incorporated herein by reference.

BACKGROUND OF THE INVENTION

Field of the Invention

The present invention relates to a method and an apparatus for controlling a damper clutch to prevent engine stall, and more particularly, to a method and an apparatus for controlling a damper clutch to prevent engine stall which can decide and correct when there is any error in control of a damper clutch in order to prevent engine stall.

Background Art

The statements in this section merely provide background information related to the present disclosure and do not necessarily constitute prior art.

In general, the greatest fault of an automatic transmission is that mileage is lower than a manual transmission because the automatic transmission transmits driving power through the medium of a fluid. Internal loss of the automatic transmission is about 70% in loss by slip of the fluid of a torque converter, about 15% in loss by drive and about 15% in loss by sliding of a clutch or a band.

In order to solve the above-mentioned demerit of the automatic transmission, a damper clutch is provided to minimize a loss by slip, reduce fuel consumption and improve silence by directly and mechanically connecting a pump of a torque converter with a turbine at the time of reaching a predetermined vehicle speed or higher.

An operation area of the damper clutch is set according to the degree of opening of a throttle valve and vehicle speed. Moreover, the damper clutch is controlled in an off-line state at a low-stage or low-speed area to enhance acceleration power of a vehicle, but is controlled in a direct connection state at a directly connected area to enhance efficiency in transmission of power.

In the meantime, the damper clutch may generally cause troubles, such as disconnection/short circuit of a damper clutch control solenoid valve (DCCSV) or impossible release/connection at the time of mechanical damper release/connection command of the damper clutch.

Particularly, in relation with the latter, there is a problem in that a control signal of a duty command value or a current command value to command a direct connection of the damper clutch becomes wrong when a control logic is replaced or added to a damper clutch controller to control the damper clutch or when a worker makes a mistake in calibration.

However, such a prior art has several disadvantages in that engine stall may occur by the direct connection of the damper clutch directly after engine start or at the low-stage or low-speed area because there is no control logic to initialize the duty command value or the current command value when the duty command value or the current command value of the damper clutch is wrong and in that acceleration power is decreased due to the direct connection at an unintended area.

SUMMARY OF THE INVENTION

Accordingly, the present invention has been made in view of the above-mentioned problems occurring in the prior art, and it is an object of the present invention to provide a method and an apparatus for controlling a damper clutch which can decide and correct that a control unit of a damper clutch controller shows a wrong duty command value or a wrong current command value so as to prevent engine stall.

Technical objects to be achieved by the present invention are not limited to the above-described objects and other technical objects that have not been described will be evidently understood by those skilled in the art from the following description.

To accomplish the above object, according to the present invention, there is provided a method for controlling a damper clutch to prevent engine stall including a first time domain deciding step of sensing a damper clutch control signal and deciding whether or not the sensed control signal is normal in a first time domain defined before engine cranking since key-on.

The method for controlling the damper clutch further includes a vehicle state information detecting step of detecting vehicle state information containing at least one of engine RPM, vehicle speed, the degree of opening of the throttle valve, turbine RPM and gear shift.

Moreover, the method for controlling the damper clutch further includes a second time domain deciding step of sensing a damper clutch control signal and deciding whether or not the control signal sensed based on the vehicle state information is normal in a second time domain defined relative to time after engine cranking.

Furthermore, the method for controlling the damper clutch further includes a control signal initializing step of initializing the control signal when it is decided that the control signal sensed in the first or second time domain deciding step is abnormal.

According to an embodiment, in the first time domain deciding step, if the sensed control signal is larger than a set value and is continued for a predetermined period of time, it is decided as abnormality.

Additionally, in the second time domain deciding step, 1) if the sensed control signal is larger than the set value and is continued for the predetermined period of time or 2) if the sensed control signal is larger than the set value and engine RPM is smaller than the set value, it is decided abnormality.

In addition, in the second time domain deciding step, in a state where a gear is located at the D-stage, if vehicle speed is lower than the set value, the degree of opening of a throttle valve is smaller than the set value and turbine RPM is smaller than the set value, it is decided as abnormality.

Moreover, the method for controlling the damper clutch further includes an actuator off step for turning off the actuator, which actuates the damper clutch, even though the control signal is initialized in the control signal initializing step, in the state where the gear is located at the D-stage, if the engine RPM is smaller than the set value and the turbine RPM is smaller than the set value.

In another aspect of the present invention, there is provided an apparatus for controlling a damper clutch to prevent engine stall including a vehicle state information detecting unit for detecting vehicle state information.

Moreover, the apparatus for controlling the damper clutch further includes an actuator for actuating the damper clutch.

Furthermore, the apparatus for controlling the damper clutch further includes a damper clutch control unit which is electrically connected with the vehicle state information detecting unit and the actuator, controls to initialize a first control signal if the first control signal received before engine cranking since key-on is in a first abnormal zone and controls to initialize a second control signal if the second control signal received before engine cranking since key-on is in a second abnormal zone.

According to an embodiment, in the first abnormal zone, the first control signal is larger than a set value and is continued for a predetermined period of time.

According to an embodiment, the vehicle state information detecting unit includes an engine RPM detecting unit for detecting engine RPM according to operation of the engine.

The vehicle state information detecting unit further includes a throttle valve opening degree detecting unit for detecting the degree of opening of the throttle valve which is opened and closed in link with an acceleration pedal.

The vehicle state information detecting unit further includes a turbine RPM detecting unit for detecting turbine RPM of a torque converter.

The vehicle state information detecting unit further includes a gear shift detecting unit for detecting the position of gear shift; and a vehicle speed detecting unit for detecting vehicle speed.

According to an embodiment, the second abnormal zone corresponds to at least one of the following three cases: 1) if the second control signal is larger than a set value and is continued for a predetermined period of time; 2) if the second control signal is larger than the set value and engine RPM is smaller than the set value; and 3) if the gear is located at the D-stage, the vehicle speed is smaller than the set value, the degree of opening of the throttle valve is smaller than the set value and the turbine RPM is smaller than the set value.

The damper clutch control unit controls to turn off a switch of the actuator when the second control signal is not controlled to be initialized. Here, in the state where the gear is located at the D-stage, when the engine RPM is smaller than the set value and the turbine RPM is smaller than the set value, initialization is not controlled.

As described above, according to a preferred embodiment of the present invention, the method and the apparatus for controlling the damper clutch can decide and correct that a control unit of a damper clutch controller shows a wrong duty command value or a wrong current command value, thereby preventing engine stall, restraining decrease of acceleration power and blocking generation of noise or vibration.

Besides the above, the present invention has various effects, such as excellent durability, and such effects will be clarified in the following detailed description of the preferred embodiment of the present invention.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
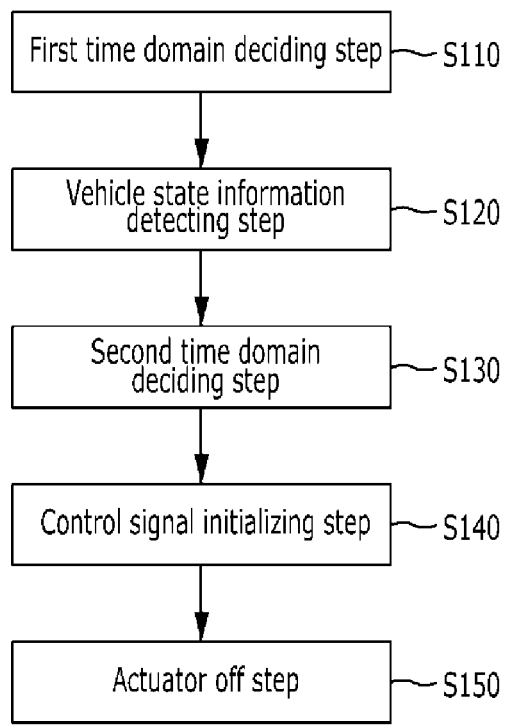
FIG. 1 is a flow chart showing a method for controlling a damper clutch to prevent engine stall according to a preferred embodiment of the present invention.

Hereinafter, the present disclosure will be described in more detail with reference to the exemplary embodiments.

When elements in the drawings are denoted by reference numerals, like elements are denoted by like reference numerals although the elements are in different drawings, and it is noted in advance that elements in different drawings are quoted in a case where description of corresponding drawings is needed. In addition, in a case where it is determined that detailed description of well-known features and configurations according to the present disclosure and all other matters unnecessarily obscure the gist of the present disclosure, the detailed description will be omitted.

It should be understood that a size or shape of the elements illustrated in the drawings may be exaggeratedly drawn to more clearly and conveniently explain the present invention. Furthermore, the terms specifically defined in consideration of the configuration and operation of the present invention are suggested only for the purpose of explaining the embodiment of present invention and do not limit the technical scope of the present invention.

FIG. 1 is a flow chart showing a method for controlling a damper clutch to prevent engine stall according to a preferred embodiment of the present invention.

As shown in FIG. 1, the method for controlling the damper clutch to prevent engine stall according to the preferred embodiment of the present invention includes: a first time domain deciding step (S110) of sensing a damper clutch control signal and deciding whether or not the sensed control signal is normal in a first time domain defined before engine cranking since key-on; a vehicle state information detecting step (S120) of detecting vehicle state information containing at least one of engine RPM, vehicle speed, the degree of opening of the throttle valve, turbine RPM and gear shift; a second time domain deciding step (S130) of sensing a damper clutch control signal and deciding whether or not the control signal sensed based on the vehicle state information is normal in a second time domain defined relative to time after engine cranking; and a control signal initializing step (S140) of initializing the control signal when it is decided that the control signal sensed in the first or second time domain deciding step (S110 or S130) is abnormal.

The first time domain may mean only that a driver keys on the vehicle before engine cranking. That is, the first time domain is a time zone before the driver who got into the vehicle keys on the vehicle and means the time zone that the engine RPM is "zero".

The damper clutch control signal means a duty command value inputted to an actuator, which actuates the damper clutch to be directly connected, namely, a damper clutch control solenoid valve (DCCSV).

The first time domain is a time zone before engine start, for instance, a zone where the duty command value is not inputted in a state where transmission gear is located at the P-stage or the N-stage and where a duty command value has not to be inputted. When the duty command value is inputted and the damper clutch is directly connected, directly after an engine is cranked, engine stall may occur due to overload. In other words, the damper clutch has not to be directly connected in the key-on state or before engine cranking. However, if the damper clutch control unit sends a control signal to command direct connection, it may be decided as malfunction of the damper clutch control unit.

Therefore, it must be prevented that the duty command value is created in the first time domain, and if the duty command value is created abnormally by malfunction, it is necessary to add a control logic to decide and initialize it.

Now, a method for deciding whether the control signal sensed in the first time domain is normal or abnormal will be described. According to the preferred embodiment of the present invention, even though the sensed control signal, namely, the sensed duty command value is smaller or larger than a set value, if the value is not continued for a predetermined period of time, the duty command value is decided as normality. In this instance, the initialization control is not carried out.

However, if the sensed duty command value is larger than the set value and is continued for the predetermined period of time, the duty command value is decided as abnormality, and in this instance, the duty command value may be controlled to be initialized into "zero".

Now, the present invention will be described in detail. If the duty command value is 70% lower than the set value, 80%, the control signal is decided as normality. However, if the duty command value is 90% and is continued for the set period of time, for instance, for five seconds or more, the control signal is decided as abnormality, and the duty command value may be controlled to be initialized into "zero".

The second time domain may be set in the time zone after the engine start. This time zone is a zone where the engine is cranked and the engine RPM is larger than "zero", and the driver may change the gear to the D stage in this time zone. For instance, the second time domain may mean the time zone for the predetermined period of time since the engine start. Here, the predetermined period of time means the time zone while the vehicle maintains the low speed and the low stage. Namely, if the damper clutch is directly connected like before the engine start even in the low-speed and low-stage state, because it may cause engine stall due to overload of the engine, it is necessary to prevent it.

Now, a method for deciding whether the control signal sensed in the second time domain is normal or abnormal will be described. According to the preferred embodiment of the present invention, even though the sensed control signal, namely, the sensed duty command value is smaller or larger than a set value, if the value is not continued for a predetermined period of time, the duty command value is decided as normality. However, if the sensed duty command value is larger than the set value and is continued for the predetermined period of time, the duty command value is decided as abnormality. Namely, the decision method in the second time domain is the same as the decision method in the first time domain.

However, the second time domain may decide normality or abnormality of the control signal in consideration of other conditions because the second time domain is the time zone after engine start. In other words, the control signal may be decided as abnormality: 1) if the sensed control signal is larger than the set value and is continued for the predetermined period of time; or 2) if the sensed control signal is larger than the set value and the engine RPM is smaller than the set value.

Particularly, when the driver changes the gear stage into the D-stage in the second time domain, according to embodiments, if the vehicle speed is lower than the set value, the degree of opening of the throttle valve is smaller than the set value and the turbine RPM is smaller than the set value, the control signal is decided as abnormality. In this instance, according to embodiments, instead of the turbine RPM, a damper clutch slip amount which is set by a difference between the engine RPM and the turbine RPM may be considered. If the slip amount is smaller than the set value, the control signal is decided as abnormality due to the direct connection of the damper clutch.

In the meantime, even though the control signal is initialized in the control signal initializing step (S140), in the state where the gear is located at the D-stage, if the engine RPM is smaller than the set value and the turbine RPM is smaller than the set value, an actuator off step (S150) for turning off the actuator, which actuates the damper clutch, is carried out.

Figure 2:
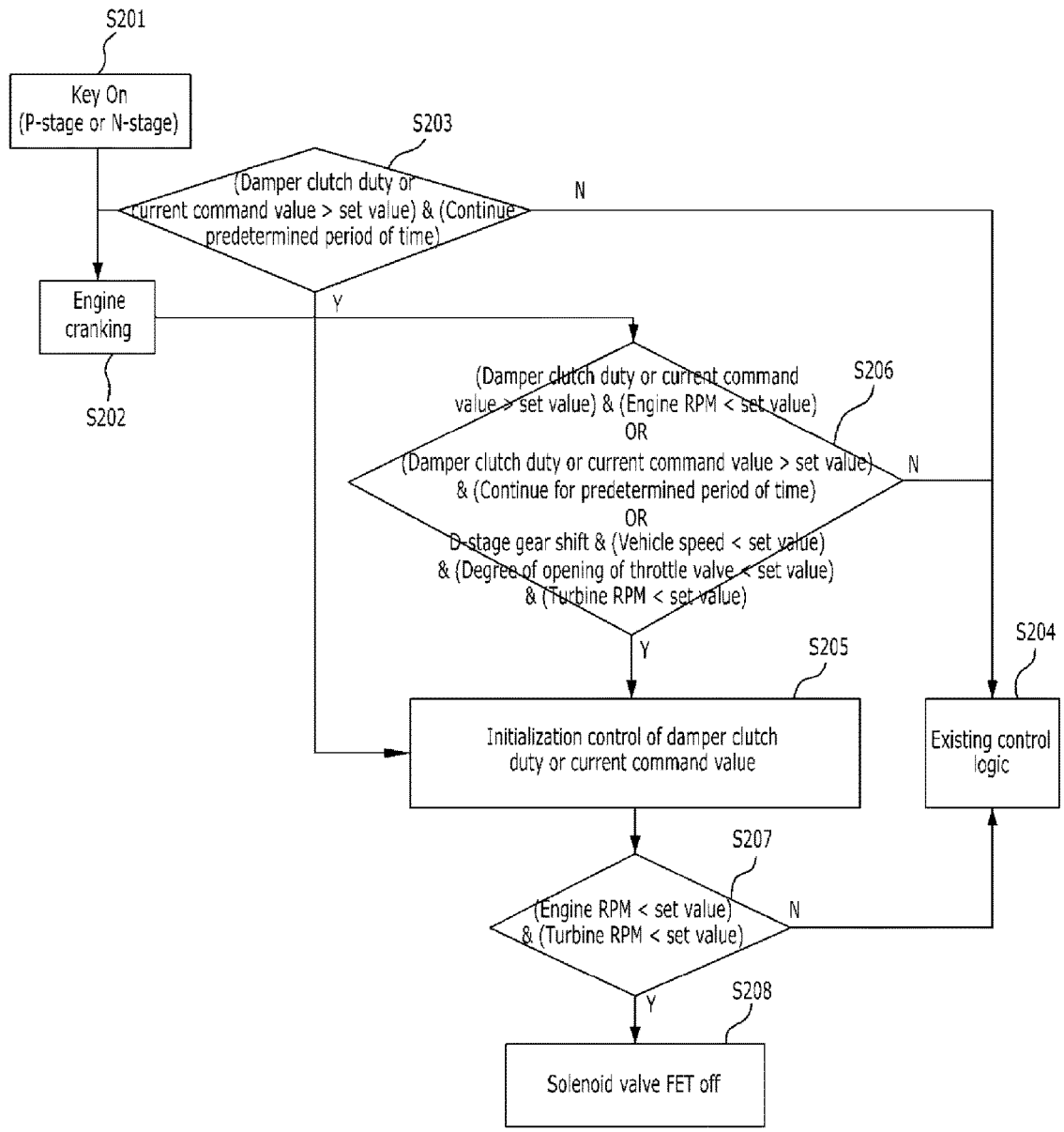
FIG. 2 is a block diagram showing a control logic of the damper clutch to prevent engine stall according to the preferred embodiment of the present invention.

FIG. 2 is a block diagram showing a control logic of the damper clutch to prevent engine stall according to the preferred embodiment of the present invention.

Referring to FIG. 2, the present invention will be described. Directly after the vehicle is turned to be keyed on (S201) and before the engine is cranked (S202), the damper clutch control logic according to the preferred embodiment of the present invention passes through the decision step (S203) in the first time domain to check whether or not the duty command value or the current command value of the damper clutch (D/C) is set to be larger than the set value and is continued for the predetermined period of time. Here, the gear directly after the key-on (S201) is located at the P-stage or the N-stage.

In the deciding step (S203) in the first time domain, if the duty command value or the current command value of the damper clutch is smaller than the set value or is not continued for the predetermined period of time, it is decided that the damper clutch is not directly connected, and then, a step of following the existing control logic (S204) is carried out.

However, in the deciding step (S203) in the first time domain, if the duty command value or the current command value of the damper clutch is larger than the set value or is continued for the predetermined period of time, it is decided that the damper clutch is directly connected, and then, an initialization controlling step (S205) of initializing the duty command value or the current command value of the damper clutch into "zero" is carried out.

Moreover, during the predetermined period of time directly after the engine is cranked (S202), a deciding step (S206) in the second time domain for deciding whether or not the damper clutch is directly connected is carried out based on the following cases. 1) If the duty command value or the current command value of the damper clutch is larger than the set value and the engine RPM is smaller than the set value, 2) if the duty command value or the current command value of the damper clutch is larger than the set value and is continued for the predetermined period of time, and 3) if the gear is located at the D-stage, the vehicle speed is lower than the set value, the degree of opening of the throttle valve is smaller than the set value and the turbine RPM is smaller than the set value, when the deciding step (S206) in the second time domain does not correspond to any of the above-mentioned three cases, it is decided that the damper clutch is not directly connected, and then, the step of following the existing control logic (S204) is carried out.

However, when the deciding step (S206) in the second time domain corresponds to any of the above-mentioned three cases, it is decided that the damper clutch is directly connected, and then, the initialization controlling step (S205) of initializing the duty command value or the current command value of the damper clutch into "zero" is carried out.

The set values and the predetermined period of time referred in the deciding step (S206) in the second time domain and the deciding step (S203) in the first time domain are set to be different from each other.

Meanwhile, after the initialization controlling step (S205) continued from the deciding step (S203) in the first time domain and the deciding step (S206) in the second time domain, an initialization control fail checking step (S207) for checking whether or not the engine RPM is smaller than the set value and the turbine RPM is smaller than the set value is carried out.

In the initialization control fail checking step (S207), if the engine RPM is larger than the set value or the turbine RPM is larger than the set value, it is decided that initialization control succeeds, and then, the step of following the existing control logic (S204) is carried out.

However, in the initialization control fail checking step (S207), if the engine RPM is smaller than the set value and the turbine RPM is smaller than the set value, it is decided that the initialization control is in failure, and then, a switch off step (S208) for turning off a switch (FET) of the solenoid valve is carried out.

Figure 3:
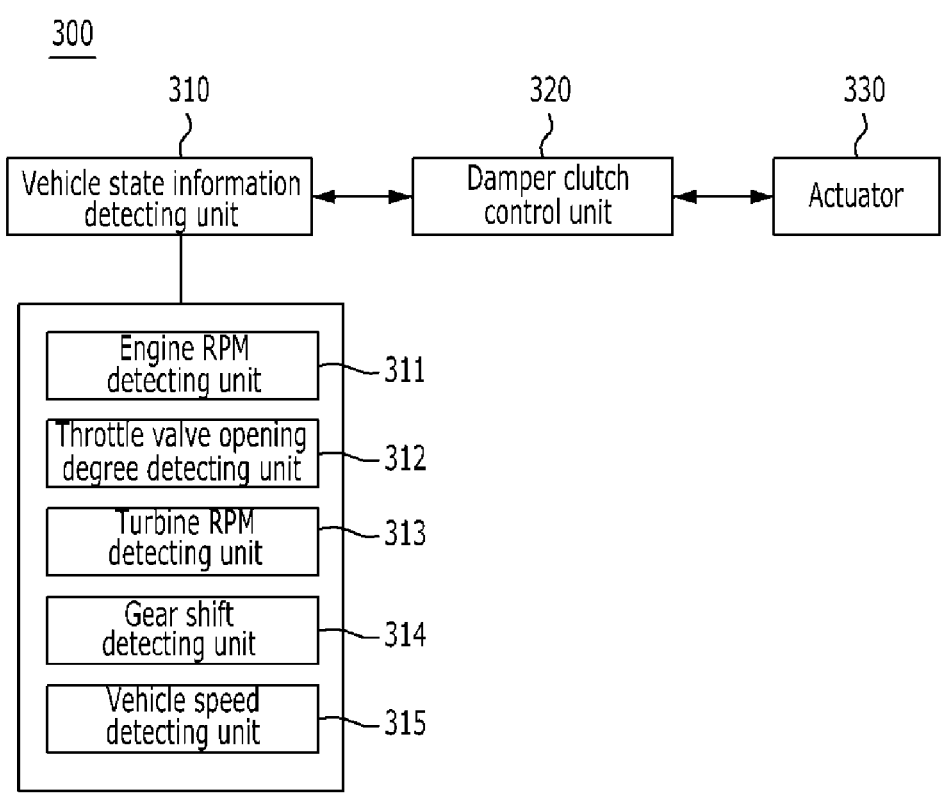
FIG. 3 is a schematic diagram showing a structure of an apparatus for controlling a damper clutch to prevent engine stall according to a preferred embodiment of the present invention.

FIG. 3 is a schematic diagram showing a structure of an apparatus for controlling a damper clutch to prevent engine stall according to a preferred embodiment of the present invention.

As shown in FIG. 3, the apparatus 300 for controlling the damper clutch to prevent engine stall according to the preferred embodiment of the present invention includes: a vehicle state information detecting unit 310 for detecting vehicle state information; an actuator 330 for actuating the damper clutch; and a damper clutch control unit 320 which is electrically connected with the vehicle state information detecting unit 310 and the actuator 330, controls to initialize a first control signal if the first control signal received before engine cranking since key-on is in a first abnormal zone and controls to initialize a second control signal if the second control signal received before engine cranking since key-on is in a second abnormal zone.

Here, that the first control signal is in the first abnormal zone means that the first control signal is larger than the set value and is continued for the predetermined period of time.

Here, the vehicle state information detecting unit 310 includes: an engine RPM detecting unit 311 for detecting engine RPM according to operation of the engine; a throttle valve opening degree detecting unit 312 for detecting the degree of opening of the throttle valve which is opened and closed in link with an acceleration pedal; a turbine RPM detecting unit 313 for detecting turbine RPM of a torque converter; a gear shift detecting unit 314 for detecting the position of gear shift; and a vehicle speed detecting unit 315 for detecting vehicle speed.

Here, that the second control signal is in the second abnormal zone means that the second control signal corresponds to one of the following three cases.

In other words, 1) if the second control signal is larger than the set value and is continued for the predetermined period of time, 2) if the second control signal is larger than the set value and engine RPM detected from the engine RPM detecting unit 311 is smaller than the set value, and 3) if the gear detected from the gear shift detecting unit 314 is located at the D-stage, the vehicle speed detected from the vehicle speed detecting unit 315 is smaller than the set value, the degree of opening of the throttle valve detected from the throttle valve opening degree detecting unit 312 is smaller than the set value and the turbine RPM detected from the turbine RPM detecting unit 313 is smaller than the set value, when the second control signal corresponds to at least one of the above-mentioned cases, it is decided that the second control signal is in the second abnormal zone.

Here, the damper clutch control unit 320 may control to turn off the switch of the actuator 330 when the second control signal is not controlled to be initialized. That is, the damper clutch control unit 320 controls to turn off a FET which switches the damper clutch control solenoid valve so that the vehicle can run in the state where the solenoid valve is turned off mechanically. In this instance, mileage becomes lower but the vehicle can run.

As described above, while the present invention has been particularly shown and described with reference to the example embodiments thereof, it will be understood by those of ordinary skill in the art that the above embodiments of the present invention are all exemplified and various changes, modifications and equivalents may be made therein without changing the essential characteristics and scope of the present invention. Therefore, it would be understood that the embodiments disclosed in the present invention are not to limit the technical idea of the present invention but to describe the present invention, and the technical and protective scope of the present invention shall be defined by the illustrated embodiments. It should be also understood that the protective scope of the present invention is interpreted by the following claims and all technical ideas within the equivalent scope belong to the technical scope of the present invention.

What is claimed is:

1. A method for controlling a damper clutch of an automatic transmission to prevent engine stall comprising:
 a first time domain deciding step of sensing a damper clutch control signal in a first time domain defined before engine cranking since key-on and deciding whether or not the sensed damper clutch control signal in the first time domain is normal;
 a vehicle state information detecting step of detecting vehicle state information containing at least one of engine RPM, vehicle speed, degree of opening of the throttle valve, turbine RPM and gear shift;
 a second time domain deciding step of sensing a damper clutch control signal in a second time domain defined relative to time after the engine cranking and deciding whether or not the sensed damper clutch control signal in the second time domain is normal based on the vehicle state information;
 a control signal initializing step of initializing the damper clutch control signal of the first or second time domain when it is decided that the sensed damper clutch control signal in the first or second time domain deciding step is abnormal; and
 a control step of controlling the damper clutch by the initialized damper clutch control signal of the first or second time domain when it is decided that the sensed damper clutch control signal in the first or second time domain deciding step is abnormal.

2. The method for controlling the damper clutch of the automatic transmission according to claim 1, wherein in the first time domain deciding step, when the sensed damper clutch control signal is larger than a set value and is continued for a predetermined period of time, it is decided as abnormality.

3. The method for controlling the damper clutch of the automatic transmission according to claim 1, wherein in the second time domain deciding step, when the sensed damper clutch control signal of the second time domain is larger than a set value and is continued for a predetermined period of time or when the sensed damper clutch control signal of the second time domain is larger than the set value and engine RPM is smaller than the set value, it is decided abnormality.

4. The method for controlling the damper clutch of the automatic transmission according to claim 1, wherein in the second time domain deciding step, in a state where a gear is located at a D-stage, when the vehicle speed is lower than a set value, the degree of opening of the throttle valve is smaller than a set value and the turbine RPM is smaller than a set value, it is decided as abnormality.

5. The method for controlling the damper clutch of the automatic transmission according to claim 1, further comprising:
an actuator off step for turning off an actuator, which actuates the damper clutch, even though the damper clutch control signal of the first or second time domain is initialized in the control signal initializing step, in a state where a gear is located at a D-stage, when the engine RPM is smaller than a set value and the turbine RPM is smaller than a set value.

6. An apparatus for controlling a damper clutch to prevent engine stall comprising:
a vehicle state information detecting unit for detecting vehicle state information;
an actuator for actuating the damper clutch; and
a damper clutch control unit which is electrically connected with the vehicle state information detecting unit and the actuator, controls to initialize a first control signal which controls the damper clutch when the first control signal received before engine cranking since key-on is in a first abnormal zone and controls to initialize a second control signal which controls the damper clutch when the second control signal received before the engine cranking since key-on is in a second abnormal zone.

7. The apparatus for controlling the damper clutch according to claim 6, wherein in the first abnormal zone, the first control signal is larger than a set value and is continued for a predetermined period of time.

8. The apparatus for controlling the damper clutch according to claim 6, wherein the vehicle state information detecting unit comprises:
an engine RPM detecting unit for detecting an engine RPM according to operation of an engine;
a throttle valve opening degree detecting unit for detecting a degree of opening of a throttle valve which is opened and closed in link with an acceleration pedal;
a turbine RPM detecting unit for detecting a turbine RPM of a torque converter;
a gear shift detecting unit for detecting a position of gear shift; and a vehicle speed detecting unit for detecting vehicle speed.

9. The apparatus for controlling the damper clutch according to claim 8, wherein the second abnormal zone corresponds to at least one of following first to third cases:
the first case wherein when the second control signal is larger than a set value and is continued for a predetermined period of time;
the second case, wherein when the second control signal is larger than a set value and engine RPM is smaller than a set value; and
the third case, wherein when a gear is located at a D-stage, the vehicle speed is smaller than a set value, the degree of opening of the throttle valve is smaller than a set value and the turbine RPM is smaller than a set value.

10. The apparatus for controlling the damper clutch according to claim 8, wherein the damper clutch control unit controls to turn off a switch of the actuator when the second control signal is not controlled to be initialized.

11. The apparatus for controlling the damper clutch according to claim 10, wherein in a state where a gear is located at a D-stage, when the engine RPM is smaller than a set value and the turbine RPM is smaller than a set value, initialization is not controlled.

\* \* \* \* \*